Jan. 27, 1942.    W. W. SHAVER    2,271,038
TEMPERING GLASS
Filed Feb. 23, 1940    2 Sheets-Sheet 1

INVENTOR.
WILLIAM W. SHAVER
BY
ATTORNEY.

Jan. 27, 1942.   W. W. SHAVER   2,271,038
TEMPERING GLASS
Filed Feb. 23, 1940   2 Sheets-Sheet 2

INVENTOR.
WILLIAM W. SHAVER
BY
ATTORNEY.

Patented Jan. 27, 1942

2,271,038

UNITED STATES PATENT OFFICE 2,271,038

TEMPERING GLASS

William W. Shaver, Corning, N. Y., assignor to Corning Glass Works, Corning, N. Y., a corporation of New York Application February 23, 1940, Serial No. 320,499

7 Claims. (Cl. 49—89)

This invention relates to improvements in tempering glass and more particularly to an improved glass tempering method.

In the tempering of glassware, the fabricated article is ordinarily first heated to a temperature near the softening temperature of the glass from which the article is made by passing it through a suitably heated kiln or alternatively through a suitably heated liquid bath, and then immediately suddenly cooled by immersion in a cooling fluid. This procedure sets a compressional stress into the outer layers of the article which is balanced by a tensional stress of equal magnitude contained within its interior. In general, it has been found that the greater the difference between the temperature to which the glass is initially heated and that to which it is subjected in the chilling process, the greater will be the compression in the surface layers of the finished article, and of course the greater will be the tension in the interior.

In practicing tempering by the ordinary methods heretofore employed, the amount of stress measured for convenience by the tension in kilograms per square millimeter, has been limited because of the tendency of the article to break or of its surface to check or crizzle when too great a thermal shock was imposed on the glass in suddenly cooling it.

The primary object of this invention is to improve the mechanical strength and thermal resistance of a glass article.

Another object is the introduction into the surface layers of a glass article a higher degree of permanent stress than any heretofore obtainable.

A further object is a simplified method of heating and cooling a glass article to temper the same.

Among its features the invention embodies so cushioning the thermal shock incident to the tempering of a glass article that its surface remains intact throughout the chilling step of the tempering operation.

In carrying the invention into practice the article is heated throughout its mass to a temperature approaching the softening temperature of the glass from which the article is made. This may be done as in ordinary practice, but preferably by immersion in a suitably heated portion of the same bath in which it is suddenly cooled by subjecting it for an extremely small period of time to another portion of the bath, the temperature of which is intermediate the temperature of the heating portion of the bath and the temperature of the final chilling portion of such bath, and finally chilling the article in the final chilling portion of the bath held at a temperature several hundred degrees below the temperature to which it was initially heated. By this procedure the heated glass is chilled by passing it through a liquid chilling bath from a point in the bath at which the chilling operation starts to another point at which it finishes, the temperature of the bath decreasing along the path taken by the glass, from a temperature at the beginning of the chilling operation which is high enough to avoid crizzling or checking of the glass, to a temperature at the finishing point low enough to give the desired degree of temper.

Figure 1:
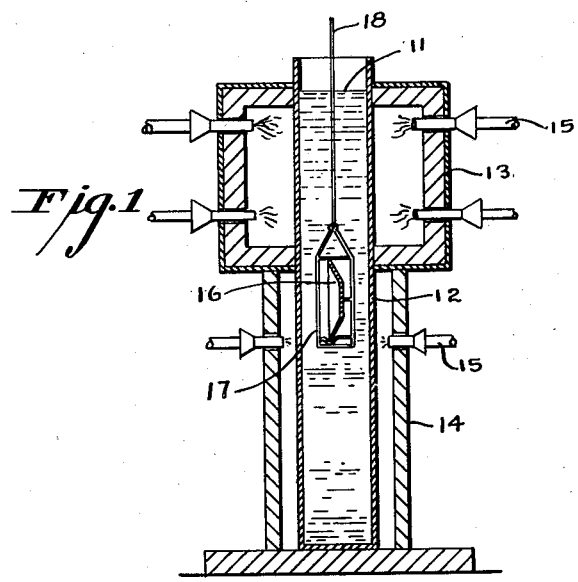
Fig. 1 is a vertical sectional view through a tank containing a tempering bath embodied in one aspect of the invention.

In Fig. 1 the bath 11 is held in a relatively deep tank 12 surrounded with muffles 13 and 14. These muffles are provided with burners 15 so controlled as to produce the desired temperature gradient in the bath. By way of example, it is assumed that it is desired to temper ware made of ordinary lime-soda glass. To temper such a glass, a mixed bath of sodium nitrate and potassium nitrate will be satisfactory for heating purposes and should be so heated that its temperature in the upper region is approximately 680° C. and reaches a temperature of approximately 250° C. in the lowermost region.

To temper an article, a dinner plate 16 for example, the same may be placed in a suitable carrier 17 supported from a rod 18 and the carrier lowered into the upper region of the bath for the time period necessary to heat the plate to near its softening temperature, after which the carrier is rapidly lowered to the bottom of the bath where it is allowed to remain for a few seconds required to cool the plate to the temperature at which the glass has become rigid enough to suffer no release of stress. Subsequent cooling below this temperature has no effect on the temper of the glass, which may be removed from the bath by quick withdrawal therefrom.

Figure 2:
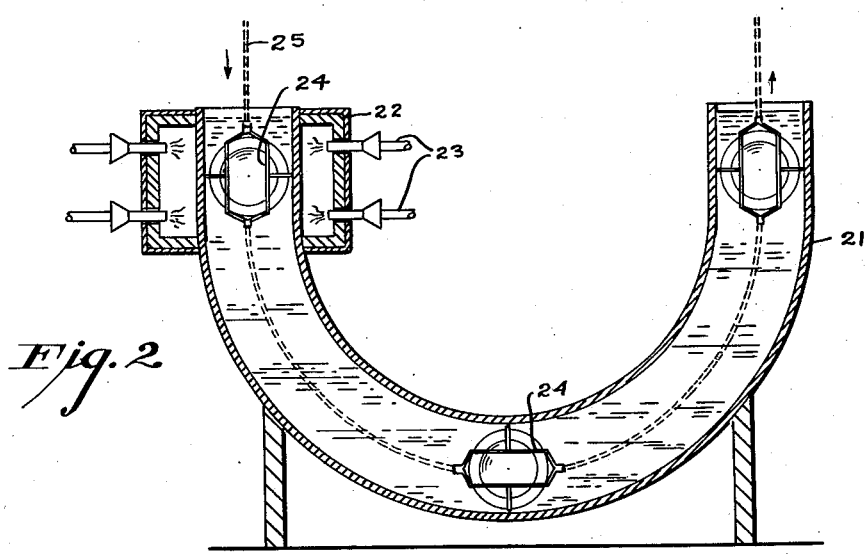
Fig. 2 is a view similar to Fig. 1 illustrating a bath embodying the invention in a second form of tank.

In Fig. 2 the bath is held in a U-shaped container 21 which at one end is provided with a muffle 22 into which heat is introduced to heat the bath by suitably controlled burners 23. The ware may be passed through the bath by suitable carriers 24 forming links of a conveyor chain 25. The chain is held stationary until the ware in the carrier at the heated portion of the bath has reached its softening temperature and is rapidly advanced far enough to bring the next carrier of the chain (not shown) into the heated portion of the bath.

Figure 3:
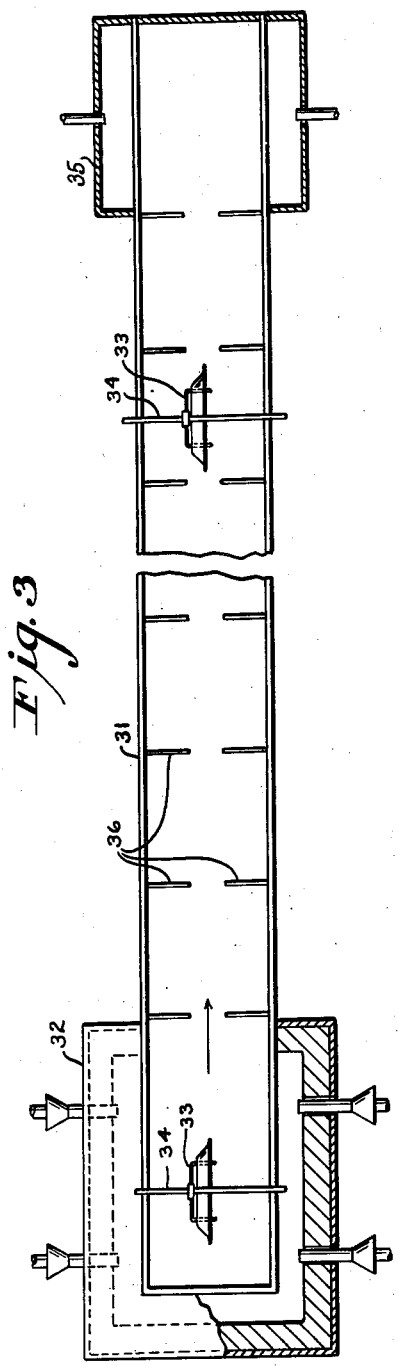
Fig. 3 is a view similar to Fig. 1 illustrating a bath embodying the invention in a third form of tank.
Figure 4:
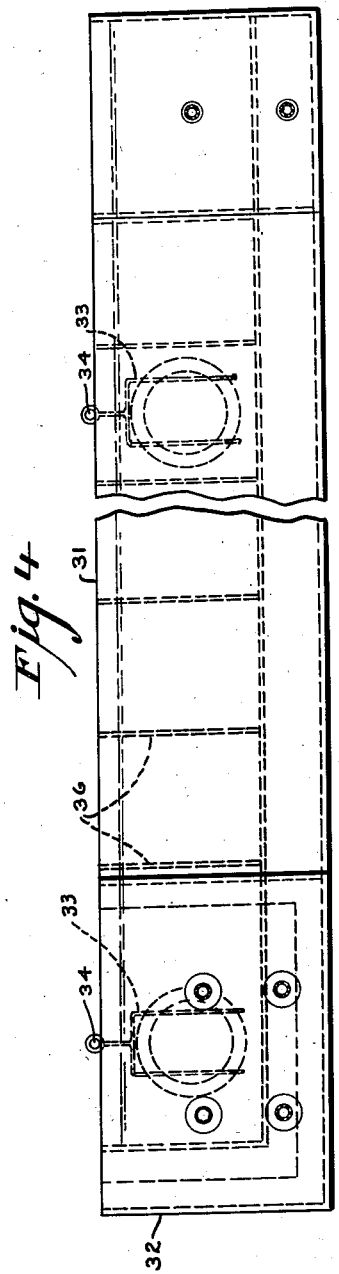
Fig. 4 is a side elevation of Fig. 3.

In the structure of Figs. 3 and 4 the bath is held in a relatively long and narrow tank 31 provided with a burner equipped muffle 32 where the temperature of the bath is maintained suitable for heating the ware, whereas the other end of the tank is provided with a muffle 35 through which a cooling medium may be circulated as required to maintain the desired chilling temperature of the bath at such end. The ware may be suspended in a carrier 33 from a cross rod 34 adapted to rest on the top of the side walls of the tank when the ware is immersed. When the ware has been properly heated, it may be quickly advanced through the gradient bath to the cooled portion thereof by employing the tank walls as tracks for the rod. The ware can thereafter be readily removed from the bath in any desired manner. A series of baffles 36 may be arranged in the tank to assist in maintaining the desired temperature gradient in the bath.

The foregoing methods contemplate receipt of ware direct from fabricating apparatus or which has been preheated to enable it to withstand introduction into the hot portions of the defined baths. The invention, however, contemplates the tempering of articles taken from stock which are at room temperature. Such articles can be tempered in a bath such as that in container 31 by adjusting the temperature gradient of the bath so that its coolest portion is so low that the ware can be introduced into the low temperature portion of the bath without causing breakage of the ware. Such ware is then advanced to the hot portion of the bath, is held there until the glass approaches its softening temperature and is then returned to the coolest portion of the bath. Obviously, the degree of stress set up in the glass can be regulated to meet the desired requirement by suitable regulation of the rate of return of the article to the coolest portion of the bath.

Obviously, the method above described may be modified to serve the purpose of performing the chilling operation only, accomplishing the necessary preheating of the ware by passing it through a suitable kiln or separate heating bath. If this is done, the temperature range of the bath employed in chilling the ware will have a temperature gradient, for example, ranging from the starting point of about 450° C. to the finishing point of 250° C. and the ware rapidly passed from the starting point to the finishing point where it will be allowed to remain for the few seconds required to cool it to the temperature at which the glass has become rigid enough to suffer no release of stress.

Although the invention has been described as applied to an ordinary soda-lime glass, it should be understood that it is also applicable to other glasses by proper selection and temperature control of the fluid baths employed for treatment of such other glasses.

I claim:

1. The method of tempering a glass article, which has been heated to a temperature near the softening temperature of the glass from which the article is made which includes rapidly chilling the article by passing it through a bath in which there is a temperature gradient which descends along the path of movement of the article.

2. The method of tempering a glass article, which has been heated to a temperature near the softening temperature of the glass from which the article is made which includes rapidly chilling the article by passing it through a bath in which there is a temperature gradient which descends from that portion of the bath at which the article enters the bath to that portion of the bath from which the article emerges.

3. The method of tempering a glass article, which includes heating and rapidly chilling the article by passing it through a bath having a temperature near the softening temperature of the glass from which the article is made in that portion of the bath into which the article is introduced and having a temperature in that portion in which chilling of the article is completed such that the article will contain the desired stress.

4. The method of tempering a glass article, which has been heated to a temperature near the softening temperature of the glass from which the article is made which includes rapidly chilling the article by passing it through a bath in which there is a temperature gradient which descends from a temperature above which crizzling of the glass can take place to a lower temperature capable of introducing into the article the desired stress.

5. The method of tempering a glass article, which has been heated to a temperature near the softening temperature of the glass from which the article is made, rapidly chilling the article by passing it through a bath having a temperature above 450° C. in that portion where introduction of the article into the bath occurs and having a temperature of about 250° C. in that portion in which completion of the chilling of the article is effected.

6. The method of tempering a glass article, which includes establishing a bath having a temperature in one portion above the softening temperature of the glass from which the article is made and a temperature in another portion capable of producing a desired degree of stress in the article, introducing the article into the hottest portion of the bath, holding the article in such portion of the bath until the glass approaches its softening temperature, then quickly passing the article through the bath to that portion of the bath capable of introducing a desired stress condition in the glass and withdrawing the article from the bath.

7. The method of tempering a glass article, which includes establishing a gradient temperature bath having a temperature in one portion above the softening temperature of the glass from which the article is made and having a relatively low temperature in another portion, introducing the article into the low temperature portion of the bath, advancing the article through the bath to the portion thereof above the softening temperature of the glass, holding it there until the glass approaches its softening temperature and then returning the article to the low temperature portion of the bath to produce a desired stress condition in the article.

WILLIAM W. SHAVER.